R. SYKORA.
ROTARY PUMP.
APPLICATION FILED APR. 29, 1921.
1,430,602.
Patented Oct. 3, 1922.
3 SHEETS—SHEET 1.
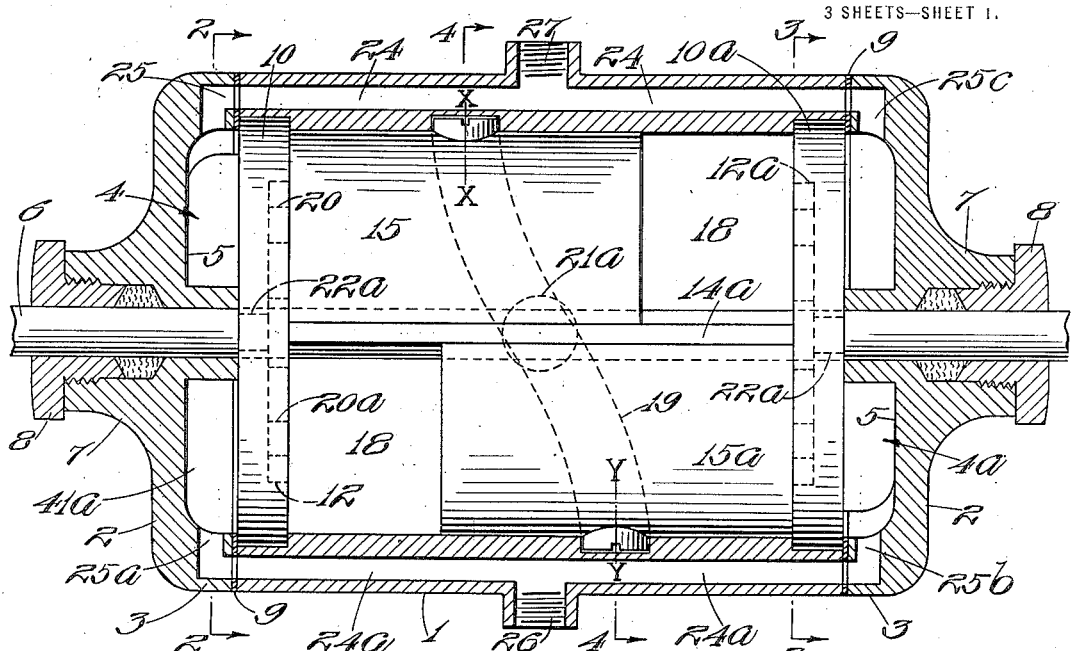
Fig. 1.
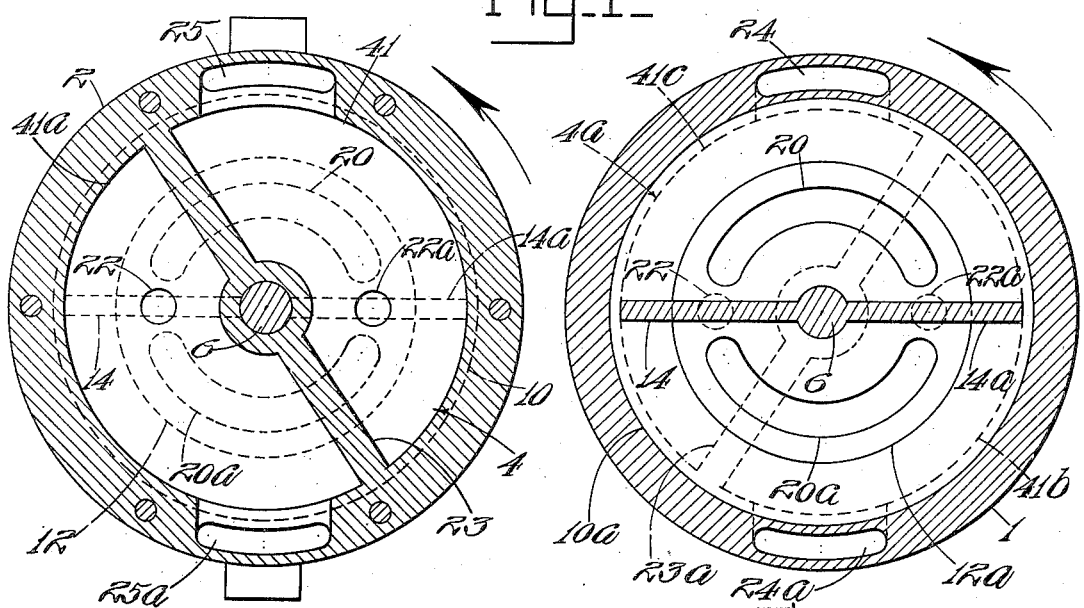
Fig. 2.
Fig. 3.
INVENTOR:
Rudolf Sykora
by Macleod, Calver, Copeland & Dike
Attys.

R. SYKORA.
ROTARY PUMP.
APPLICATION FILED APR. 29, 1921.

1,430,602.

Patented Oct. 3, 1922.
3 SHEETS—SHEET 2.

INVENTOR:
Rudolf Sykora
by Macleod, Calver, Copeland & Dike
Attys.

R. SYKORA.
ROTARY PUMP.
APPLICATION FILED APR. 29, 1921.

1,430,602.

Patented Oct. 3, 1922.
3 SHEETS—SHEET 3.

INVENTOR:
Rudolf Sykora
by Macleod, Calver, Copeland & Dike
Attys.

Patented Oct. 3, 1922.

1,430,602

UNITED STATES PATENT OFFICE.

RUDOLF SYKORA, OF BOSTON, MASSACHUSETTS.

ROTARY PUMP.

Application filed April 29, 1921. Serial No. 465,425.

*To all whom it may concern:*

Be it known that I, RUDOLF SYKORA, a citizen of the United States, residing at Boston, county of Suffolk, State of Massachusetts, have invented a certain new and useful Improvement in Rotary Pumps, of which the following is a specification, reference being had therein to the accompanying drawings.

The invention relates to a new and useful improvement in rotary pumps. The object of the invention is to provide a rotary pump adapted to propel fluid, either liquid or gas, by means of combined rotary and reciprocating mechanism.

The invention will be fully understood from the following description when taken in connection with the accompanying drawings, and the novel features thereof will be pointed out and clearly defined in the claims at the close of this specification.

In the drawings, Fig. 1 is a side elevation partly in section of a device embodying the invention.

Fig. 2 is a section on line 2—2 of Fig. 1.
Fig. 3 is a section on line 3—3 of Fig. 1.
Fig. 4 is a section on line 4—4 of Fig. 1.
Fig. 5 is an end view of one of the cylinder heads.

Figure 4:
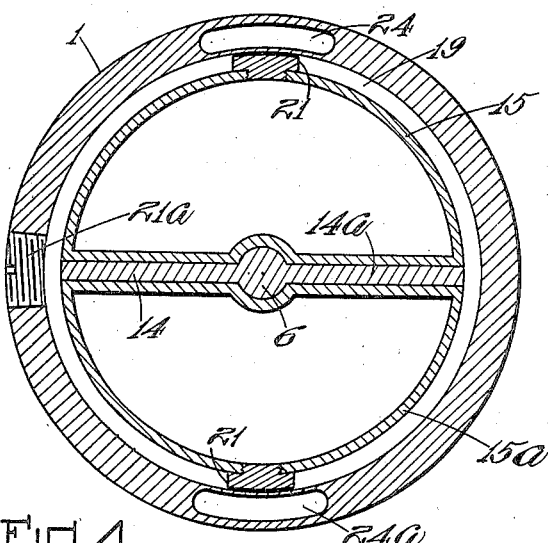
Figure 8:
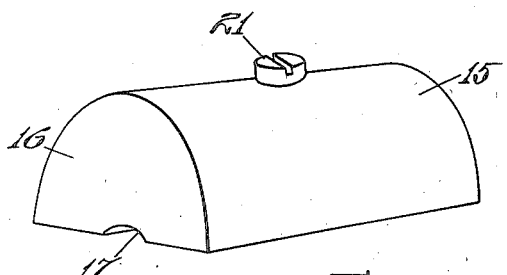
Fig. 8 is a perspective view of one of the semi-cylindrical reciprocating members.
Figure 7:
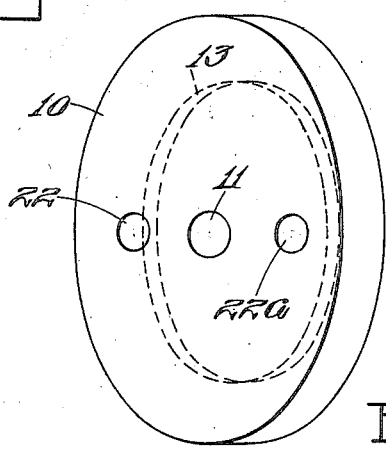
Fig. 7 is a perspective view of the cylinder cap.
Figure 6:
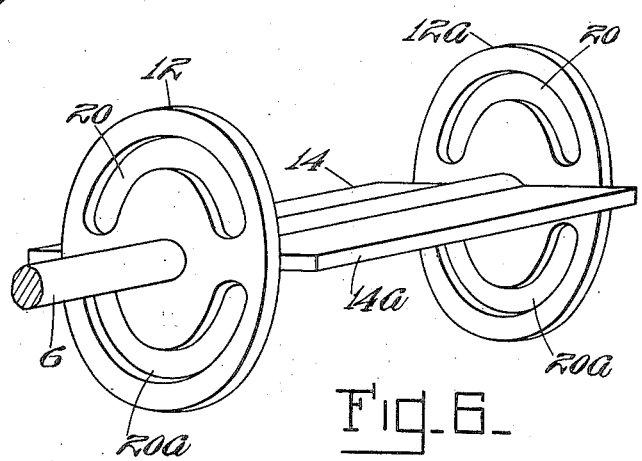
Fig. 6 is a perspective view in detail showing the shaft and the disks and wings integral with each other.
Figure 5:
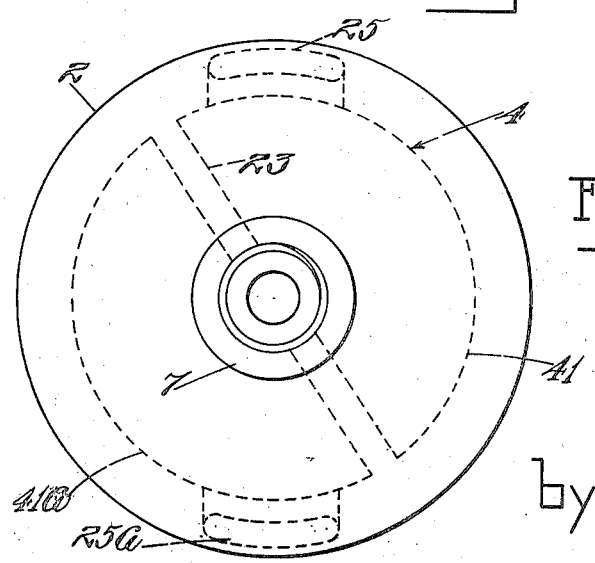

Referring now to the drawings, 1 represents a cylinder which is closed at each end by a head or cap 2, having a somewhat concave inner face and an inwardly extending annular flange portion 3, thus forming hollow spaces 4, 4ª at the opposite ends between the inner faces 5 of the heads or caps 2 and the inserted disks 10 and 10ª respectively for the purpose which will be hereinafter described.

A rotary shaft 6 extends longitudinally through the center of the cylinder and through the disks 10, 10ª and the cylinder heads 2. The cylinder head is provided at each end with a hollow boss 7, which is tapped out on its inner periphery and into which is screwed a bushing 8 through which the shaft 6 passes.

Preferably a washer 9 is provided between the cylinder head and the cylinder to form a tight joint. The cylinder heads may be united to the cylinder by suitable means in a well-known manner.

The cylinder is provided with two disk members 10, 10ª inserted in its opposite ends between which and the cylinder heads 2 are the spaces 4, 4ª, as hereinbefore mentioned, said inserted members being apertured for the purpose which will be hereinafter described. They are each provided with a central aperture 11 through which the shaft passes.

Mounted on the shaft and preferably formed integral therewith are two circular disks 12, 12ª of equal diameter and of considerable less diameter than the interior of the cylinder. Preferably their diameter is about one-half the diameter of the inner periphery of the cylinder. Each end-closing disk member 10, 10ª of the cylinder has in its inner face a circular recess 13 into which the disks 12, 12ª fit. The depth of these recesses is equal to the thickness of the disks 12, 12ª.

Connected with the shaft and preferably formed integral therewith are two wings 14, 14ª which extend laterally from the shaft to the inner wall of the cylinder and lie in the same plane with each other. These wings 14, 14ª extend longitudinally of the length of the space between the two disks 12, 12ª and have a combined spread equal to the internal diameter of the cylinder, as shown in Figure 4, so that the outer edge of each wing extends beyond the periphery of the disk. The disks 12, 12ª are thus each divided into two equal parts by the wings.

The interior of the cylinder is also thus divided longitudinally by the wings into two semi-cylindrical compartments.

Located in the semi-cylindrical compartments respectively are the semi-cylindrical sliding members or pistons 15, 15ª, having a sliding fit therein, each having closed ends 16 and being closed also on its sides. Each of said piston members is formed with a longitudinal groove 17 in its flat side face of a depth equal to the elevation of the shaft from the plane of the wings so that said two piston members 15, 15$^a$ will together embrace the shaft by a sliding fit. Each piston member is considerably shorter than the interior length of the cylinder, so that when either piston member is at one end of the cylinder, there will be left a space 18 between one end of the piston member and one end of the cylinder.

The interior surface of the cylinder is provided with a groove 19 which extends entirely around the interior periphery of the cylinder at an inclination to the longitudinal line of the cylinder and crossing the median line of the cylinder twice in its orbit. A plane passing through the cylinder in the median line of the groove would cut the cylinder at an angle of inclination to the axis of the cylinder and the groove will describe an ellipse with the axis of the cylinder passing through the center. The angle of inclination of the plane of the groove to the longitudinal line of the cylinder is such that the distance between two planes at right angles to the axis of the cylinder and cutting through the median line of the groove at the two points which are farthest from the transverse median line of the cylinder, as indicated by the distance between the two lines X—X and Y—Y, is equal to the length of the space 18 between one end of the cylinder and the end of the piston member when the said piston member is at the opposite end of the cylinder as shown in Figure 1; that is, it is equal to the excess length of the cylinder over the length of the piston member. Preferably the orbit of the groove is not in a flat plane but is in a plane which describes a sort of ogee or reverse curve, as shown in Figure 1.

Each disk 12, 12$^a$ is provided with two concentric arc-shaped slots 20, 20$^a$, one in each half of the disk and arranged on opposite sides of the plane of the wings 14, 14$^a$. Preferably the two slots 20, 20$^a$ are at equal radial distances from the axis of the shaft, and they are symmetrically arranged with relation to each other. The middle of the bow of each slot 20, 20$^a$ is ninety degrees from the plane of the two wings 14, 14$^a$, that is, the middle of the bows of the two slots are in a line which is perpendicular to the plane of the two wings.

Each piston member 15, 15$^a$ is provided with a projection 21 on the outer periphery of said member at the middle thereof measured both longitudinally and circumferentially. As shown in the drawings this projection is in the form of a plug. These plugs both fit in the groove 19, said groove forming a cam to guide the movement of the pistons as will be hereinafter described. As the periphery of each piston member fits close to the interior periphery of the cylinder, the plug 21 is inserted into the piston through a hole in the wall of the cylinder after the piston is inserted in the cylinder. The hole is then closed by a plug or cap 21$^a$.

Each cylinder end disk 10, 10$^a$ is provided with two round apertures 22, 22$^a$ on diametrically opposite sides of the shaft aperture 11, and each one is midway between the center of the shaft aperture 11 and the periphery of the said disk. Each aperture 22, 22$^a$ is also preferably of the same diameter as the short diameter of the arc-shaped slots 20, 20$^a$. When the shaft 6 rotates, thereby rotating the disks 12, 12$^a$, the two slots 20, 20$^a$ will at a certain point in the rotation come into alignment respectively with the two apertures 22, 22$^a$, and will continue in such alignment until the shaft has rotated far enough for the entire length of the slots 20, 20$^a$ to move past the apertures 22, 22$^a$.

The recesses 4, 4$^a$ in the cap-shaped cylinder heads 2 are respectively bisected by one of the partition walls 23, 23$^a$, passing diametrically through the said recess The planes of the partition walls 23, 23$^a$ intersect each other and also intersect a plane passing through the centers of the two apertures 22, 22$^a$ in the cylinder end disks 10, 10$^a$, the plane which passes through said apertures being between the planes of the partition walls, as will be seen by reference to Figures 2 and 3. The partition 23 divides the left-hand end into two chambers 41, 41$^a$, and the partition 23$^a$ divides the right-hand end into two chambers 41$^b$, 41$^c$.

The two apertures 22, 22$^a$ in the disks 10, 10$^a$, respectively open into the two chambers formed in the cylinder head 4 by the partition walls 23 and 23$^a$, one of the said apertures opening into each chamber. The exact angle of the plane of the partitions 23, 23$^a$ to the plane passing through the apertures 22, 22$^a$ is immaterial; the essential point is that the apertures 22, 22$^a$ shall open into separate chambers in the cylinder head.

The cylinder 1 is formed with two passages 24, 24$^a$ extending longitudinally thereof. These passages are preferably formed in the wall of the cylinder. Two passages 25, 25$^a$ are formed in the left-hand cylinder head 4 which lead respectively from the two chambers 41, 41$^a$ formed by the partition 23 at points opposite to each other, and respectively open into the two passages 24, 24$^a$, and two passages 25$^b$ and 25$^c$ lead from the chambers 41$^b$ and 41$^c$ and open respectively into the passages 24 and 24$^a$, so that there is a continuous passage at all times from each one of the chambers formed by the partitions 23, 23$^a$ in the cylinder heads through the wall of the cylinder to one of the chambers in the cylinder head at the opposite end.

Two passages 26 and 27 are formed in the wall of the cylinder midway of the length thereof and communicating respectively with the longitudinal passages 24, 24ᵃ. One of said two passages 26, 27 is the inlet and the other is the outlet. For convenience of description, we shall refer to the passage 26 as being the inlet, and to 27 as being the outlet.

The cylinder is preferably mounted in such position as to lie horizontally, as shown in Figure 1, and with the planes of the partition walls 23, 23ᵃ of the cylinder head intersecting each other.

The parts as shown in Figures 1, 2 and 3 are in neutral position, that is, the passageway from the inlet pipe 26 into the pump is closed and the outlet passage from the pump through the outlet pipe 27 is closed, because the arc-shaped slots 20, 20ᵃ are not in registration with the apertures 22, 22ᵃ. In this position the piston 15 shown on the upper side in Figure 1, is in the left-hand end of the cylinder and the lower piston 15ᵃ is in the right-hand end of the cylinder. The connection is always open from the inlet pipe 26 through the longitudinal passage 24ᵃ, and through the passages 25ᵃ and 25ᵇ into one of the two chambers in each of the two opposite ends of the cylinder formed by the partitions in the cylinder heads, that is, into the chambers 41ᵃ and 41ᵇ, and the outlet passage 27 is always in open communication with the longitudinal passage 24 in the cylinder, and with the passages 25 and 25ᶜ which connect said longitudinal passage 24 with the other pair of chambers 41 and 41ᶜ in the ends of the cylinder on the opposite side of the partitions 23, 23ᵃ from those which are connected with the passages 25ᵃ and 25ᵇ.

Figure 9:
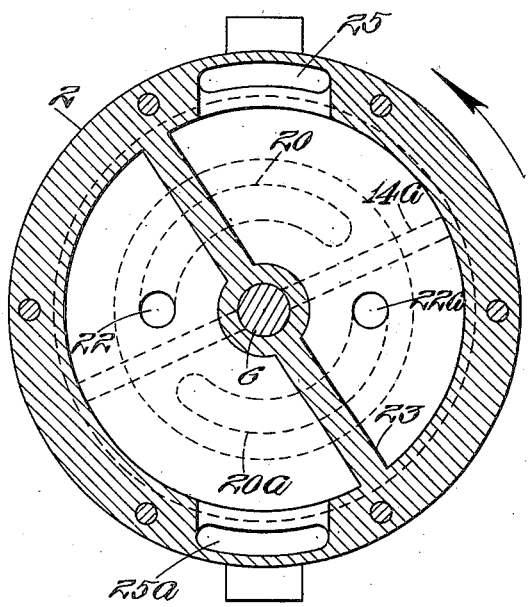
Fig. 9 is a sectional view on the same line as Fig. 2, but showing the parts in the position after the shaft and the parts carried thereby have rotated far enough to bring the arc-shaped slots in the disks into registration with the openings in the cylinder end so as to open the inlet and outlet.
Figure 10:
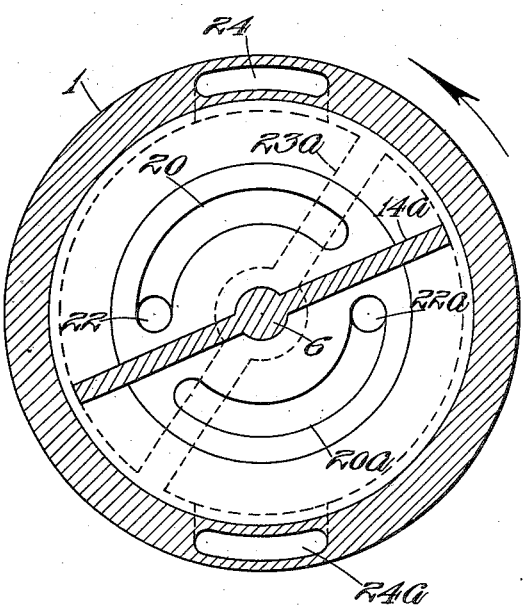
Fig. 10 is a sectional view on the same line as Fig. 3, showing the position of the parts when the shaft has revolved as in Fig. 9.

Now assuming that the shaft 6 is rotating in the direction shown by the arrows in Figures 2 and 3, that is from the right over toward the left, when looking in the direction of the arrows in Figure 1, namely, looking from the left-hand end toward the right-hand end, when the shaft rotates far enough for the left-hand end, of the arc-shaped slots 20 to come into registration with the aperture 22 in the inserted cylinder-head disks 10, 10ᵃ, the right-hand end of the arc-shaped slots 20ᵃ will come into alignment with the apertures 22ᵃ in the disks 10, 10ᵃ, as shown in Figures 9 and 10. This opens communication from the inlet pipe 26 through the passage 24ᵃ and the semi-circular chamber 41ᵃ at the left-hand of the cylinder head, thence through the aperture 22 and the slot 20 which opens into the cylinder at a point to admit fluid against the left-hand end of the upper piston 15 shown in Figure 1.

The initial rotation of the shaft during the movement necessary to bring the arc-shaped groove 20 into registration with the aperture 22 will have moved the said piston 15 partway toward the right, thus beginning to open a space in the cylinder between the left-hand end of the said member 15 and the left-hand cylinder head, and the passage from the slot 20 will be into this newly opened space or chamber. This will form a vacuum which will cause suction from the inlet 26 around through the connecting passages above described, to cause the fluid to flow into said newly forming chamber. At the same time the other piston, that is the lower one as viewed in Figure 1, will be moving toward the left and fluid will be drawn in to the chamber being formed at the right-hand end of said lower piston 15ᵃ through the side wall passage 24ᵃ, and the passage 25ᵇ, and the chamber 41ᵇ in the right-hand cylinder head, thence through the aperture 22ᵃ in the right-hand cylinder head disk member 10ᵃ and the lower arc-shaped slot 20ᵃ in the disk 12ᵃ, thence into the cylinder to press against the right-hand end of the lower piston 15ᵃ. Thus the upper piston 15 will be moving toward the right and the lower piston 15ᵃ will be synchronously moving toward the left.

The rotation of the shaft which opens the inlet passages above described will also bring the lower arc-shaped slot 20ᵃ in the left-hand disk 12 into registration with the passage 22ᵃ, and thence into the chamber 41 at the left-hand end of the cylinder head, thus opening the passage through the aperture 25 into the outlet side passage 24 and outlet port 27. This will open a complete passage from the lower left-hand space 18 through to the outlet 27. Correspondingly there will also be a continuous passage from the upper right-hand chamber 18 out through the outlet 27.

As the upper piston 15 moves toward the right and the lower piston 15ᵃ moves toward the left, as already described, to draw fluid into the newly forming chamber, the said pistons will operate to press the fluid out of both the said chambers 18 and through the outlet.

The admission of fluid through the inlet and the expulsion of fluid from the outlet will thus continue until the pistons have moved to the full end of the stroke in one direction and then the passage will be closed. This takes place during a half rotation of the shaft. During the second half of rotation of the shaft, communication with the inlet and outlet passages will be again opened, only the chambers, which have just been filled, will expel their contents through the outlet and new chambers will be formed at the ends of the pistons from which the chambers have just expelled their contents, and will open to the inlet pipe and be filled.

The shaft may be rotated by any suitable driving power. Briefly therefore, in the operation of the rotor the wings 14, 14ᵃ and the disks 12, 12ᵃ attached to the shaft and rotated therewith carry the pistons 15, 15ᵃ in the direction the shaft rotates. The plugs 21 being fast on the periphery of said pistons follow the orbit of the cam groove 19 on the inner periphery of the cylinder and carry the pistons in a rotary movement around with the shaft in the cylinder, and at the same time cause them to move in a longitudinal direction of the cylinder in the path of a spiral curve. The two pistons, however, move synchronously in opposite directions to each other. The cam groove in which the plugs are moving being inclined to the median line of the cylinder and describing an ellipse in which one side is ascending and the other is descending, the plugs following the course of this orbit or groove move the pistons in the spiral path from one end of the cylinder to the other and then reverse direction and move back again at each complete rotation of the shaft. The movements of the two pistons are reciprocal to each other.

Describing the movement of the fluid, the fluid passes through the inlet into the wall of the cylinder, dividing into two branches where the inlet opens into the peripheral wall in the cylinder, the two branches going in opposite directions through the peripheral connections in the caps into the two semi-circular chambers which are diametrically opposite each other and at opposite ends of the cylinder, thence through the round apertures in the insert members and through the arc-shaped apertures of the disks on the shaft on one side of the plane of the wings into one of the semi-cylindrical compartments in the cylinder, and on the opposite side of the plane of the wings the fluid will pass through a similar channel of communication into the other semi-cylindrical compartment at the opposite end of the cylinder.

The shaft now rotating, the piston members while rotating with it move also away from the apertures, and the vacua created by the increase in space in the semi-cylindrical compartments between the retreating end of the piston member and the cylinder end disk causes the said vacuum space to be filled with the inrushing fluid. Simultaneously with the vacua created in the cylinder at the retreating ends of the two piston members, pressure is created at the other end on the fluid which is within the semi-cylindrical space at that end of the cylinder, and therefore expels the fluid through the outlet. When during the rotation of the shaft the end of each arc-shaped aperture passes beyond the round apertures in the insert member, the passage is closed by the unapertured part of the disk, and at that moment the shaft, the wings, the disks, the piston members and the fluid will have completed one semi-cycle. The fluid retained in the semi-cylindrical compartments is cut off from the inlet and the outlet, and the parts are then ready for the next semi-cycle on the return stroke.

On the return stroke the fluid which has just been taken in at the opposite ends of the two piston members will be expelled through the outlet and fluid will be admitted to the cylinder at the ends of the piston members from which it has just been expelled.

While the invention has been shown and described as embodied in a device employing two pistons each moving in a semi-cylindrical compartment formed by two wings on the shaft, it is obvious that the same principle would be involved if a multiple of two wings and a corresponding number of pistons are employed.

The arrangement of the moving parts in the pump is such as to maintain the center of gravity in the same position and to balance the internal friction on all moving parts.

While I have especially described the apparatus as being intended for use as a pump, it is also adapted for use as a motor. When used as a motor it is preferable to make the angle of inclination of the groove 19 in the cylinder wall more inclined to the axis of the shaft than that shown in Figure 1.

What I claim is:—

1. A pump having in combination a cylinder and piston, means for giving to the piston a combined rotary and longitudinal reciprocating movement, and means for forming a chamber for said piston which is changeable with relation to the cylinder during the movement of the piston.

2. A pump having in combination a cylinder, a plurality of pistons in said cylinder, means for giving to said pistons a combined rotary and longitudinal reciprocating movement, and means for forming chambers for said pistons which are changeable with relation to the cylinder during the movement of the pistons.

3. A pump having in combination, a cylinder, a plurality of pistons in said cylinder, means for giving to each of said pistons a combined rotary and longitudinal reciprocating movement, means for forming chambers in said cylinder for said pistons, and means whereby the positions of said chambers are changeable with relation to the cylinder during the movement of the pistons.

4. A pump having in combination a cylinder, a plurality of pistons in said cylinder movable in parallel paths, means for giving to each of said pistons a combined rotary and longitudinal reciprocating movement, and means for dividing the interior of the cylinder into compartments, one for each piston, the said division member and cylinder being changeable, one with relation to the other.

5. A pump having in combination a cylinder, a plurality of pistons in said cylinder movable in parallel paths, means for giving to each of said pistons a combined rotary and longitudinal reciprocating movement, and rotatable partition members which divide the cylinder into separate compartments, one for each piston within and with relation to the cylinder and which rotate with the pistons, thereby maintaining constantly a separate compartment for each piston.

6. A pump having in combination a cylinder and piston, means for giving to the piston a spiral reciprocating movement within the cylinder and with relation to the cylinder, and means whereby at each stroke of the piston in either direction a partial vacuum is produced to draw fluid into one part of the cylinder, and pressure is created by the advancing end of the piston to expel fluid admitted to another part of the cylinder at the previous stroke.

7. A pump having in combination a cylinder, a rotary member located within the cylinder which divides the interior into two constantly changing chambers, two pistons located in said chambers on opposite sides of the said rotatable partition member, and means for synchronously reciprocating said pistons in opposite directions to each other.

8. A pump having in combination a cylinder, a rotary member located within the cylinder which divides the interior into two constantly changing chambers, two pistons located in said chambers on opposite sides of the said rotatable partition member, and means for synchronously reciprocating said pistons in opposite directions to each other in spiral paths of movement.

9. A pump having in combination a cylinder, a rotary member located within the cylinder which divides the interior into two constantly changing chambers, two pistons located in said chambers on opposite sides of the said rotatable partition member, means for synchronously reciprocating said pistons in opposite directions to each other in spiral paths of movement, and means whereby at each stroke of each piston in either direction a partial vacuum is produced to draw fluid into one part of the cylinder, and pressure is created by the advancing end of the piston to expel fluid admitted to another part of the cylinder at the previous stroke.

10. A pump having in combination a cylinder provided with a head at each end, a rotary shaft which passes longitudinally through the center of the cylinder and cylinder heads, wings mounted on said shaft within the cylinder and dividing the interior of the cylinder into parallel longitudinal compartments and rotating with the shaft, a piston located in each of the compartments formed by said wings, means whereby the rotation of the shaft and wings rotates both of said pistons, and means whereby the pistons are caused to reciprocate longitudinally within their respective compartments in the cylinder in opposite directions to each other synchronously with their rotation.

11. A pump having in combination a cylinder, a plurality of pistons in said cylinder movable in parallel paths, means for giving to each of said pistons a combined rotary and longitudinal reciprocating movement, and rotatable partition members which divide the cylinder into separate compartments one for each piston and which rotate with the pistons within and with relation to the cylinder, thereby maintaining constantly a separate compartment for each piston, the cylinder being provided with a head at each end, each cylinder head having a hollow chamber divided into compartments, said cylinder being provided with passages one of said passages communicating with one of the compartments in each of the two chambers in the opposite heads of the cylinder, the other of said passages communicating with the other chamber in each of the two cylinder heads, an inlet port leading into one of said longitudinal passages, an outlet leading from the other longitudinal passage, means for opening communication from one end of the longitudinal compartments in the cylinder, and from the opposite end of the other longitudinal compartment into their respective compartments in the cylinder head which are in open communication with the inlet, and means for opening communication from the other ends of said two compartments of the cylinder into those compartments in the cylinder heads which are in open communication with the outlet port.

12. A pump having in combination a cylinder provided with a head at each end, a rotary shaft which passes longitudinally through the center of the cylinder and cylinder heads, wings mounted on said shaft within the cylinder and dividing the interior of the cylinder into longitudinal compartments and rotating with the shaft, a piston located in each of the compartments formed by said wings, means whereby the rotation of the shaft and wings rotates said pistons, means whereby the pistons are caused to reciprocate longitudinally within the cylinder in opposite directions to each other synchronously with their rotation, each cylinder head having a hollow chamber divided into compartments, said cylinder being formed with longitudinal passages, one of said passages communicating with one of the compartments in each of the two chambers in the opposite heads of the cylinder, the other of said passages communicating with the other chamber in each of the two cylinder heads, an inlet port leading into one of said longitudinal passages, an outlet port leading from the other longitudinal passage, means for opening communication from one end of one of the longitudinal compartments in the cylinder and from the opposite end of the other longitudinal compartment into the respective compartments in the cylinder head which are in open communication with the inlet, and means for opening communication from the other ends of said two compartments of the cylinder into those compartments in the cylinder heads which are in open communication with the outlet port.

13. A pump having in combination a cylinder provided with a head at each end, a rotary shaft which passes longitudinally through the center of the cylinder and cylinder heads, wings mounted on said shaft within the cylinder and dividing the interior of the cylinder into longitudinal compartments and rotating with the shaft, a piston located in each of the compartments formed by said wings, means whereby the rotation of the shaft and wings rotates said pistons, means whereby the pistons are caused to reciprocate longitudinally within the cylinder in opposite directions to each other synchronously with each other and with their rotation, each cylinder head having a hollow chamber divided into two compartments, said cylinder being formed with two longitudinal passages, one of said passages communicating with one of the compartments in each of the two chambers in the opposite heads of the cylinder, the other of said passages communicating with the other chamber in each of the two cylinder heads, an inlet port leading into one of said longitudinal passages, an outlet port leading from the other longitudinal passage, means for opening communication from one of the compartments in each of the two opposite cylinder heads with the longitudinal compartment in the cylinder which is in communication with the inlet port, means for opening communication from the other compartment in each of the two cylinder heads with the longitudinal compartment in the cylinder which is in open communication with the outlet port, and means whereby said communication between the longitudinal compartments of the cylinder and the several compartments in the cylinder head will be closed when the said pistons are at the extreme end of the cylinder, and will be open after a predetermined initial longitudinal movement of the pistons, and will be closed again just before the said pistons reach the end of their stroke at the opposite end of the cylinder.

14. A pump having in combination a cylinder having a head at each end, a rotary shaft passing longitudinally through the center of the cylinder and through the center of each head, wings mounted on said shaft which divide the cylinder at all times into longitudinal compartments during the rotation of the shaft, and a piston mounted in each of said longitudinal compartments in the cylinder, the cylinder being formed with a groove extending around its inner periphery in form of an ellipse in a plane which intersects the axis of the cylinder at an angle of inclination thereto, each piston being formed with a guide member which engages with said groove, whereby, when the shaft rotates, two pistons are reciprocated synchronously and in opposite directions to each other.

15. A pump having in combination a cylinder having a head at each end, a rotary shaft passing longitudinally through the center of the cylinder and through the center of each head, wings mounted on said shaft which divide the cylinder at all times into longitudinal compartments during the rotation of the shaft, and a piston mounted in each of said compartments in the cylinder, the cylinder being formed with a groove extending around its inner periphery in the form of an ellipse in a plane which intersects the axis of the cylinder midway of its length at such an angle that the distance between a point in the median line of the groove at the point which is farthest from the median line of the cylinder and a point at the median line of the cylinder will be equal to the excess length of the interior of the cylinder over the length of the piston, each piston being formed with a guide member which engages with said groove, whereby, when the shaft rotates, two pistons are reciprocated synchronously and in opposite directions to each other.

16. A pump having in combination a cylinder having a head at each end, a rotary shaft passing longitudinally through the center of the cylinder and through the center of each head, wings mounted on said shaft which divide the cylinder at all times into equal longitudinal compartments during the rotation of the shaft, a piston mounted in each of said compartments in the cylinder, the cylinder being formed with a groove extending around its inner periphery in a plane which intersects the axis of the cylinder at an angle of inclination thereto, each piston member being formed with a guide member which engages with said groove, whereby, when the shaft rotates, two pistons are reciprocated synchronously and in opposite directions to each other, the cylinder having at each end a disk which together with the cylinder head forms a chamber between the said disk and the cylinder head, a partition which divides said chamber into two compartments, the plane of said partition being always parallel to the longitudinal axis of the wings of the said shaft, the planes of the wings constantly changing their radial relation to the planes of said partitions during the rotation of the wings, each of said disks being formed with two round apertures, one of which leads into one of the compartments in the cylinder head and the other of which leads into the other compartment in the cylinder head, said rotary shaft having mounted thereon two disks one at each end of the wings and each of which fits into a recess in the inner face of one of the disks in the cylinder head, each of said shaft disks being formed with two arc-shaped slots concentric with the shaft, one of said arc-shaped slots in each of the shaft disks opening wholly into the semi-cylindrical compartment of the cylinder on one side of the plane of the wings, and the other arc-shaped slot in each of the shaft disks opening wholly into the compartment in the cylinder on the other side of the plane of said wings.

17. A pump having in combination a cylinder, closing members for each end of the cylinder, a cap for each end closing member forming together with the end closing member a hollow space between the interior of the cap and the end closing member, a partition wall in each of said hollow spaces between the cylinder end and the cap dividing each space into two chambers, the plane of the partition wall at one end intersecting the plane of the partition wall at the other end, two apertures in each of the said cylinder ends so located that one of said apertures leads from one of said chambers into the cylinder and the other aperture leads from the companion chamber into said cylinder, a rotary shaft which passes loosely through said cylinder and end closing members and caps coaxially therewith, two wings mounted fast on said shaft within the cylinder and rotating with the shaft, said wings dividing the cylinder into two compartments at all times during the rotation of the shaft and wings, two circular disks mounted coaxially on the shaft at the opposite ends of the wings and rotating therewith, each disk being formed with two concentric arc-shaped slots of equal size extending entirely through the disk, the two arc-shaped slots being located in two opposite portions of the disk and each adapted to register with one of the said apertures in the cylinder end at predetermined times in the rotation of the shaft, two conduit passages extending lengthwise of the cylinder, one of said conduits opening into one of the compartments between the cap and end closing member at each end of the cylinder, and the other conduit opening into the other pair of compartments at two opposite ends, an inlet port leading from outside into one of said conduit passages and an outlet port leading from the other of said conduit passages, a piston in each of the compartments formed in the cylinder by said wings and carried around with the shaft and wings in their rotation, a circumferential groove in the interior wall of the cylinder whose orbit is in form of an ellipse in a plane which intersects the axis of the cylinder at an angle of inclination thereto, each piston having a guide member which engages with said groove, whereby when the shaft rotates and carries with it the said piston, said pistons will also be given a synchronous reciprocating movement in opposite directions to each other, the passage from the inlet into the two semi-cylindrical chambers in the cylinder being opened to admit fluid against one end of each piston, and the passage from the cylinder at the other ends of the pistons to the outlet being opened when the slotted disks carried by the shaft are in position for the arc-shaped slots therein to register with the apertures in the cylinder ends.

18. A pump having in combination a cylinder provided with a head at each end, a rotary shaft which passes longitudinally through the center of the cylinder and cylinder heads, wings mounted on said shaft within the cylinder dividing the interior of the cylinder into two equal, longitudinal parts and rotating with the shaft, a piston located in each of the compartments formed by said wings, means whereby the rotation of the shaft and wings rotates both of said pistons, means whereby the pistons are caused to reciprocate longitudinally within the cylinder in opposite directions to each other synchronously with their rotation, an inlet port having passages which lead into the interior of said cylinder through both ends thereof, one of which communicates with the compartment in which one of the said pistons is located and the other of which opens into the opposite end of the cylinder into the compartment in which the other piston is located, and an outlet passage having communication with the two compartments in which said pistons are located at the opposite ends of the pistons from the inlet thereto.

In testimony whereof I affix my signature.
RUDOLF SYKORA.